United States Patent

Inagaki

(10) Patent No.: US 7,549,031 B2
(45) Date of Patent: Jun. 16, 2009

(54) METHOD AND APPARATUS FOR PERFORMING DATA BACKUP

(75) Inventor: Takashi Inagaki, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 197 days.

(21) Appl. No.: 11/703,423

(22) Filed: Feb. 6, 2007

(65) Prior Publication Data

US 2007/0208917 A1 Sep. 6, 2007

(30) Foreign Application Priority Data

Mar. 3, 2006 (JP) .............................. 2006-058259

(51) Int. Cl.
*G06F 12/16* (2006.01)
(52) U.S. Cl. ....................... 711/162; 711/161
(58) Field of Classification Search ........................ None
See application file for complete search history.

(56) References Cited

U.S. PATENT DOCUMENTS 5,454,099 A 9/1995 Myers et al.
6,366,987 B1 * 4/2002 Tzelnic et al. ............... 711/162
2004/0250032 A1 * 12/2004 Ji et al. ........................ 711/162

FOREIGN PATENT DOCUMENTS

| JP | H04-253235 | 9/1992 |
|----|------------|--------|
| JP | PUPA06-044116 | 2/1994 |
| JP | H06-250902 | 9/1994 |
| JP | PUPA06-100754 | 12/1994 |
| JP | PUPA08-113374 | 7/1996 |
| JP | 2001-229297 | 8/2001 |
| JP | 2002-297427 | 10/2002 |
| JP | 2005-108133 | 4/2005 |
| JP | 2005-149285 | 6/2005 |

* cited by examiner

*Primary Examiner*—Than Nguyen
(74) *Attorney, Agent, or Firm*—Dillon & Yudell, LLP (57) ABSTRACT

A method for performing data backups is disclosed. An initial backup operation is performed on all datasets within a recording medium. A subsequent backup operation is performed on any of the datasets in a day at which the dataset has been rewritten or in a day at which a predetermined period for the dataset expires, whichever day comes first. The subsequent backup operation is performed on any of the datasets until another initial backup operation needs to be performed on all of the datasets again.

3 Claims, 11 Drawing Sheets

| DATA SET NUMBER | VERSION NUMBER |
|---|---|
| #1 | V1 |
| #2 | V2 |
| #3 | V3 |
| #4 | V4 |
| #5 | V5 |
| ⋮ | ⋮ |

| DATA SET NUMBER | VERSION NUMBER | TIMESTAMP |
|---|---|---|
| #1 | V1 | T1 |
| #2 | V2 | T2 |
| #3 | V3 | T3 |
| #4 | V4 | T4 |
| #5 | V5 | T5 |
| ⋮ | ⋮ | ⋮ |

(a)
BEFORE BACKUP JOB
(M=0)

| DS-NO | V-NO |
|---|---|
| #1 | - |
| #2 | - |
| #3 | - |
| #4 | - |
| #5 | - |
| #6 | - |
| #7 | - |
| #8 | - |
| #9 | - |
| #10 | - |
| #11 | - |
| #12 | - |

(b)
BEFORE BACKUP JOB
(M=6)

| DS-NO | V-NO |
|---|---|
| #1 | 5 |
| #2 | - |
| #3 | 4 |
| #4 | - |
| #5 | 2 |
| #6 | - |
| #7 | 3 |
| #8 | 0 |
| #9 | 0 |
| #10 | 0 |
| #11 | 0 |
| #12 | 0 |

(c)
BEFORE BACKUP JOB
(M=7)

| DS-NO | V-NO |
|---|---|
| #1 | 5 |
| #2 | 6 |
| #3 | 4 |
| #4 | - |
| #5 | 2 |
| #6 | 6 |
| #7 | 3 |
| #8 | 0 |
| #9 | 0 |
| #10 | 0 |
| #11 | 0 |
| #12 | 0 |

(d)
BEFORE BACKUP JOB
(M=9)

| DS-NO | V-NO |
|---|---|
| #1 | 5 |
| #2 | 6 |
| #3 | 4 |
| #4 | 8 |
| #5 | 2 |
| #6 | 6 |
| #7 | - |
| #8 | 7 |
| #9 | 7 |
| #10 | - |
| #11 | 7 |
| #12 | 7 |

METHOD AND APPARATUS FOR PERFORMING DATA BACKUP

CROSS REFERENCE TO RELATED APPLICATIONS

The present application claims benefit of priority under 35 U.S.C. §§ 120, 365 to the previously filed Japanese Patent Application No. JP2006-058259 entitled, "Apparatus, Method and Program for Data Backup" with a priority date of Mar. 3, 2006, which is incorporated by reference herein.

BACKGROUND OF THE INVENTION

1. Technical Field

The present invention relates to data recording in general, and in particular to a method and apparatus for performing data backup.

2. Description of Related Art

If data previously recorded on a recording medium, such as a magnetic disk, have been corrupted, an enormous effort is required to recover the data. A common method for avoiding the above-mentioned problem is to perform a backup operation by copying the data from the recording medium to a backup medium, such as a magnetic tape, during non-working hours. Then, even if the data in the recording medium become corrupted for any reason, the corrupted data can be restored by using the corresponding data stored in the backup medium.

There are several conventional methods for performing a backup operation. The first method is known as a differential backup. A differential backup allows a backup operation to end within a short time. Specifically, in every backup operation, among all the data that need to be backed up, whichever part that has been changed since the last backup operation will be extracted and copied to a backup medium. For example, a differential backup can be performed as follows:

1. In a first backup run, all the data that needs to be backed up are copied (a full backup); and
2. In a second and subsequent backup runs, a difference between the data at the current time and data at the time of the last backup run is extracted, and then a differential backup is generated. The difference can be extracted by using file time-stamps, version numbers of data, or the like. The version numbers are managed by a file system or a disk device in a way that each of the version numbers is assigned to each file block.

When a backup is created by using this method, the restoration of data requires a heavy workload. This is because it is necessary to restore the full backup created in the first backup run and then to sequentially restore the differential backups created in the second and subsequent backup runs. In addition, with this method, pieces of backup data needed for restoration are scattered across a large number of backup media. Thus, there is a risk that some data may not be able to be restored due to a loss or damage of any of the backup media.

One way to decrease the workload and the risk of the first method is to employ a second method in which a full backup is created on a more frequent basis. For example, a full backup is created once a week, and differential backups are created on the other days.

The third method allows all differential backups, each specified by using a level, to be combined similar to the "dump" command in UNIX. With the third method, a differential level, such as a monthly backup, a weekly backup or a daily backup, is assigned to each of the backups, and each of the backups is executed according to the assigned level. In every backup, the level is used for controlling the extraction of a difference in data that should be actually backed up. For example, in a weekly backup, whatever part of data that has changed since the last weekly or monthly backup is extracted regardless of whether or not a backup of the part has been created in the daily backups. Such part is then copied to a backup medium.

With the third method, data are restored as follows. Initially, the data is restored to a state in the latest month by using the monthly backup. Then, data pieces different from those of the above state are restored by using the weekly backups, and finally data are restored on a daily basis by using the daily backups. The third method, which uses a combination of the backups of different time frames, can reduce the number of backup media needed for restoration.

SUMMARY OF THE INVENTION

However, all of the above-mentioned methods cannot provide a satisfactory solution to meet the backup demand. This is because any of the above-mentioned methods requires about one day when a full backup needs to be executed. In other words, even when a differential backup that takes a relatively short amount of time is sufficient to restore the lost data, a full backup that takes a very long time needs to be executed. As a result, the time required for a full backup becomes the bottleneck for a backup system. Consequently, it would be desirable to provide an improved method and apparatus for performing data backup.

In accordance with a preferred embodiment of the present invention, an initial backup operation is performed on all datasets within a recording medium. A subsequent backup operation is performed on any of the datasets in a day at which the dataset has been rewritten or in a day at which a predetermined period for the dataset expires, whichever day comes first. The subsequent backup operation is performed on any of the datasets until another initial backup operation needs to be performed on all of the datasets again.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
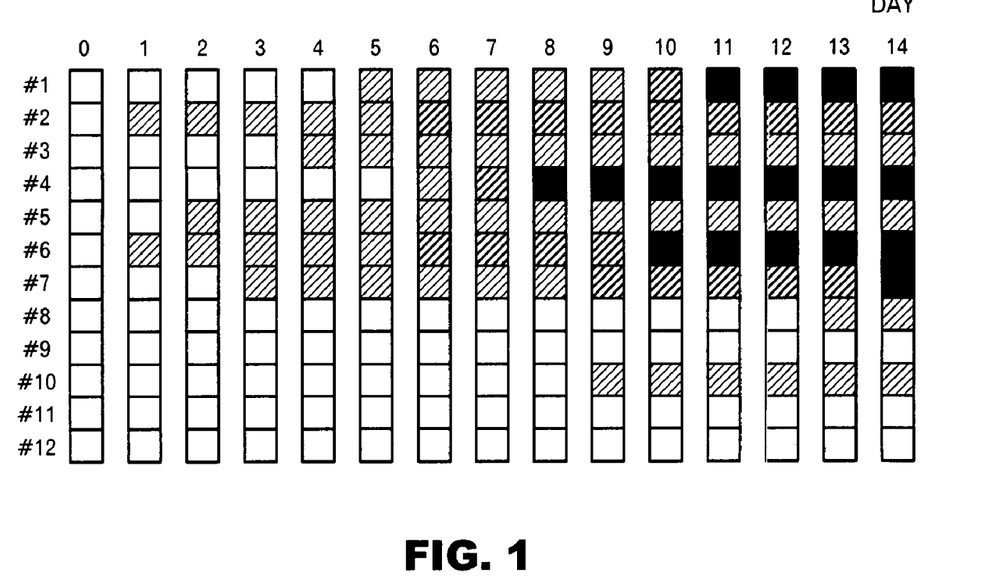
FIG. 1 is a diagram showing the transitions in various datasets for 14 days.

Referring now to the drawings and in particular to FIG. 1, there is depicted a diagram showing the transitions in each of datasets #1 to #12 for 14 days. The generations of each dataset are indicated by different degrees of hatch line density. Specifically, if a dataset in white is updated, the dataset is expressed as one having an area with thin hatch lines. If the dataset is updated again, the dataset is expressed as one having an area with thick hatch lines. If the data set is updated yet again, the dataset is expressed as one having a completely black area. For example, dataset #1 is rewritten on the $5^{th}$, $10^{th}$ and $11^{th}$ days, and dataset #2 is rewritten on the $1^{st}$ and $6^{th}$ days. Datasets #9, #11 and #12 have never been rewritten for 14 days.

Figure 2:
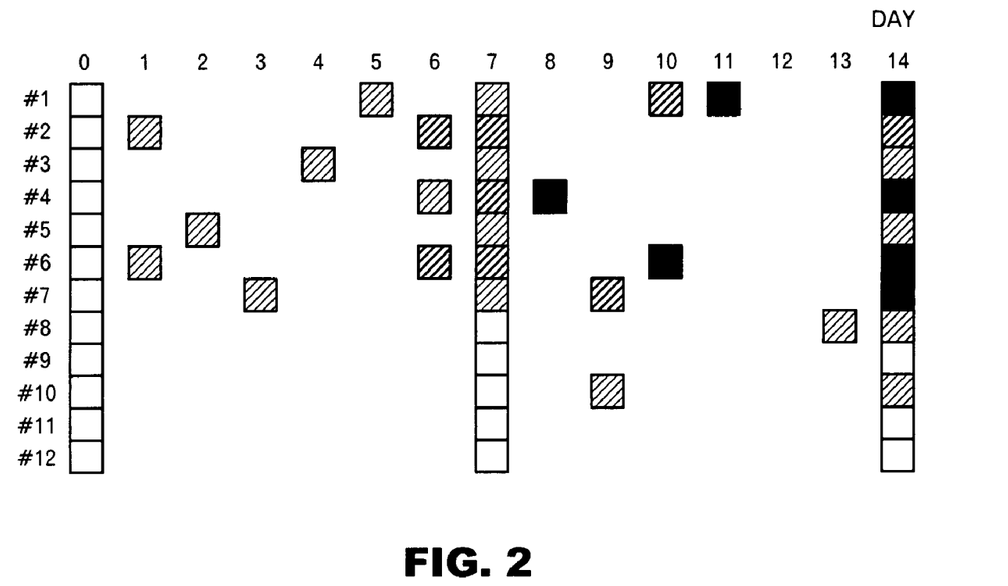
FIG. 2 is a diagram showing days in which each dataset from FIG. 1 is backed up using a method according to the prior art.

FIG. 2 shows days in which each dataset from FIG. 1 is backed up using a prior art method. The prior art method requires a full backup to executed once a week, and differential backups to be executed during between days. As shown, all the datasets are backed up on the $0^{th}$, $7^{th}$ and $14^{th}$ days. On each of the days other than the above-mentioned three days, only a dataset, or datasets, has been updated on that very day is backed up. For example, since dataset #1 is rewritten on the $5^{th}$, $10^{th}$ and $11^{th}$ days, dataset #1 is backed up on those days in addition to the $0^{th}$, $7^{th}$ and $14^{th}$ days. Similarly, since dataset #2 is rewritten on the 1st and 6th days, dataset #2 is backed up on those days in addition to the $0^{th}$, $7^{th}$ and $14^{th}$ days.

Figure 3:
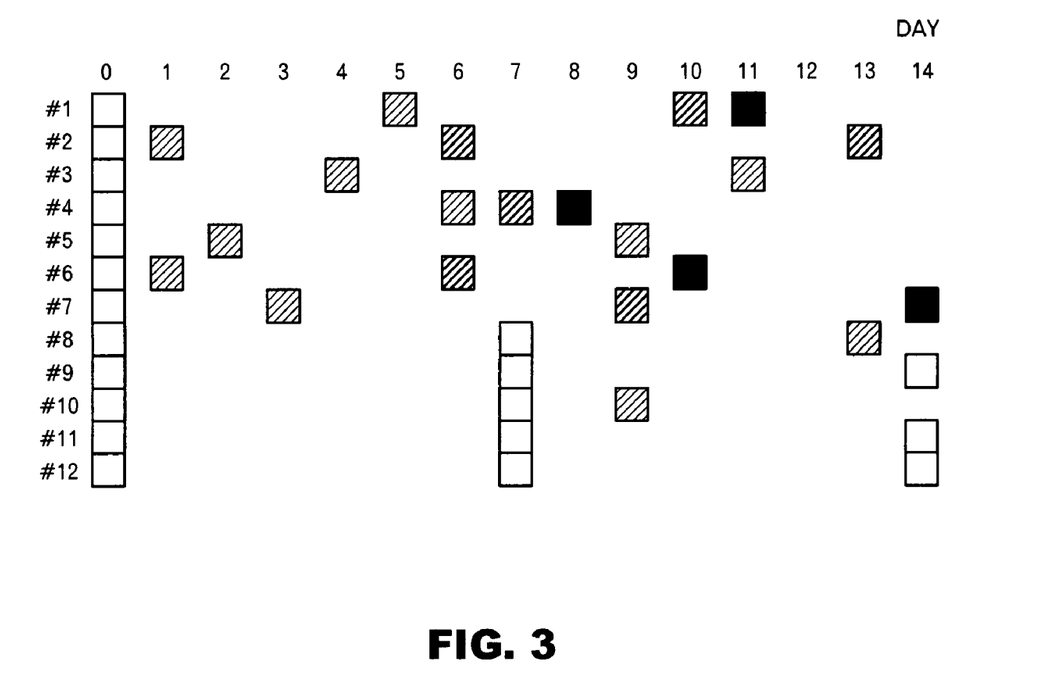
FIG. 3 is a diagram showing days in which each dataset from FIG. 1 is backed up using a method of the present invention.

FIG. 3 shows days in which each dataset from FIG. 1 is backed up using a method of the present invention. The method of the present invention requires an expiration period to be set at seven days. For example, since dataset #1 is rewritten on the $5^{th}$, $10^{th}$ and $11^{th}$ days, dataset #1 is backed up on those days. The backup of dataset #1 is never caused by the termination of the expiration period because dataset #1 is always rewritten within seven days, (i.e., the expiration period). Since dataset #2 is rewritten on the $1^{st}$ and $6^{th}$ days, dataset #2 is backed up on those days. Dataset #2 is never rewritten after the rewriting on the $6^{th}$ day, and then seven days (the expiration period) have passed since then. Hence, dataset #2 is backed up on the $13^{th}$ day on termination of the expiration period.

Each of the other datasets is also backed up on a day when each of the datasets is rewritten. In addition, each of the datasets is also backed up on condition that seven days have passed since the last backup. For example, such backups are executed on the $11^{th}$ day for dataset #3, the $9^{th}$ day for dataset #5, the $7^{th}$ day for dataset #8, the $7^{th}$ and $14^{th}$ days for dataset #9, the $7^{th}$ day for dataset #10, the $7^{th}$ and $14^{th}$ days for dataset #11, and the $7^{th}$ and $14^{th}$ days for data set #12.

By comparing FIGS. 2 and 3, it is clear that the method of the present invention shown in FIG. 3 does not require the execution of a full backup on the $7^{th}$ and $14^{th}$ days, as in the prior art method shown in FIG. 2. Thus, the method of the present invention reduces the time required for each daily backup and evens out the time for backup between daily backups.

The following are descriptions of a system configuration and operations in which data are backed up by using the method of the present invention. There are two embodiments to the present invention. In a first embodiment, a function of updating datasets and a function of determining datasets, which should be backed up, are interacted with each other, while in a second embodiment, those functions do not interact with each other.

I. First Embodiment

Figure 4:
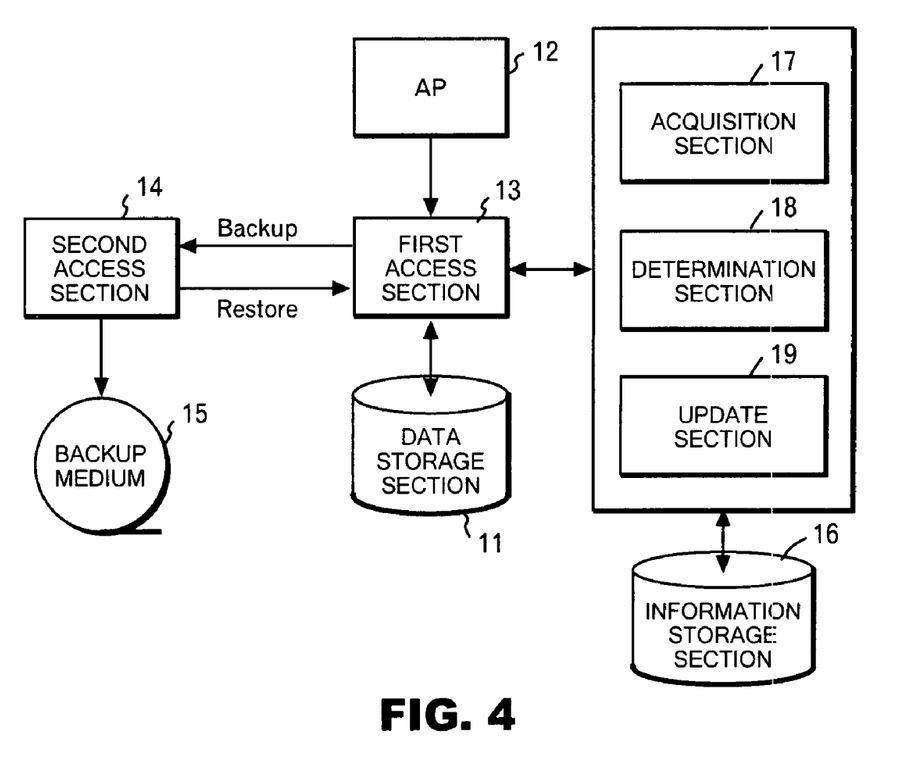
FIG. 4 is a block diagram of a backup system, in accordance with a first embodiment of the present invention.

FIG. 4 is a block diagram of a backup system, in accordance with a first embodiment of the present invention. As shown, a system includes a data storage section 11, an application program product (AP) 12, a first access section 13, a second access section 14 and a backup medium 15. Data storage section 11 is a storage medium for storing data that needs to be backed up, and can be formed of, for example, a magnetic disk. AP 12 is a program product causing a certain process to be executed, and the certain process includes a process of updating the data stored in data storage section 11. According to an update instruction from AP 12, first access section 13 updates the data stored in data storage section 11. In addition, at the time of a backup, first access section 13 reads the data from data storage section 11, and transmits the data to second access section 14. At the time of a restoration, first access section 13 receives the data from second access section 14, and writes the data received in data storage section 11.

At the time of a backup, second access section 14 receives data from first access section 13, and writes the data received to backup medium 15. At the time of a restoration, second access section 14 reads data from backup medium 15, and transmits the data to first access section 13. Backup medium 15 is a recording medium used for backing up data, and a magnetic tape can be employed as backup medium 15.

First access section 13 and second access section 14 joined together can be regarded as a "transfer section," since they transfer data from data storage section 11 to backup medium 15. In addition, the first embodiment has a function of determining which part of data should be backed up among the data stored in data storage section 11. Specifically, such function is associated with first access section 13. To be more precise, an information storage section 16, an acquisition section 17, a determination section 18, and an update section 19 are involved in the fulfillment of such function.

Information storage section 16 stores management information that are used for determining which part of data should actually be backed up, and, for example, a magnetic disk device can be used for forming this section. In addition, acquisition section 17 acquires the management information from information storage section 16, and determination section 18 determines, according to the management information, which part of data should actually be backed up. Update section 19 updates the management information if needed. The operation of updating the management information includes an operation of erasing or rewriting version numbers of backup operations. Update section 19 can be regarded as an "erasing section" during the erasing operation.

Figure 5:
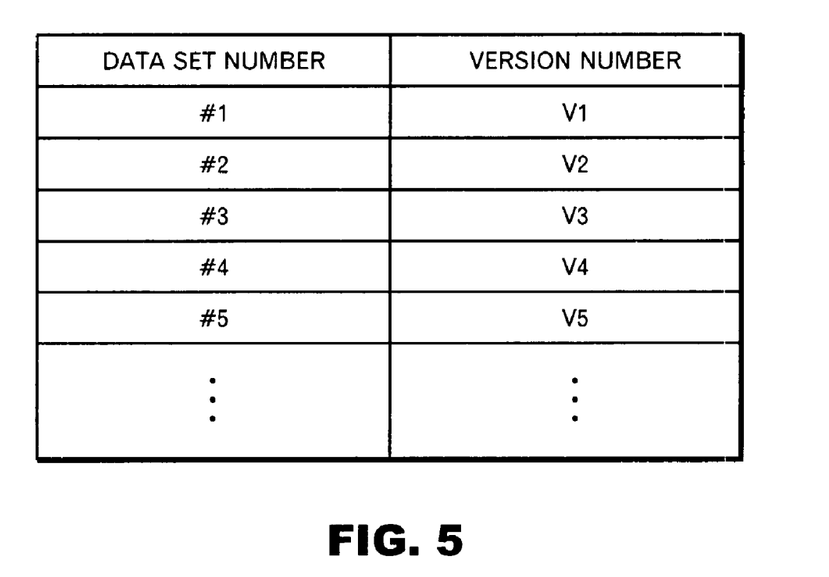
FIG. 5 is a diagram showing an example of management information used in a first embodiment of the present invention.

FIG. 5 shows the management information stored in information storage section 16, though only a part directly related to the present embodiment is extracted therefrom. In other words, the management information includes metadata of a file system, a block information management table of a magnetic disk device, and the like, and, in such management information, corresponding relationships are managed as shown in FIG. 5. Specifically, information storage section 16 records, in the management information, the number of each data set, and the number of a backup execution in which the last backup of the dataset is executed (hereinafter, referred to as a version number).

The management information may include information such as an expiration period E, which will be descried later, and a version number of the last backup run. In the present embodiment, a backup run is executed once a day, as shown in the example of FIG. 3. In other words, an expiration period is equivalent to the number of backup run executions until backed-up data becomes invalid.

Figure 6:
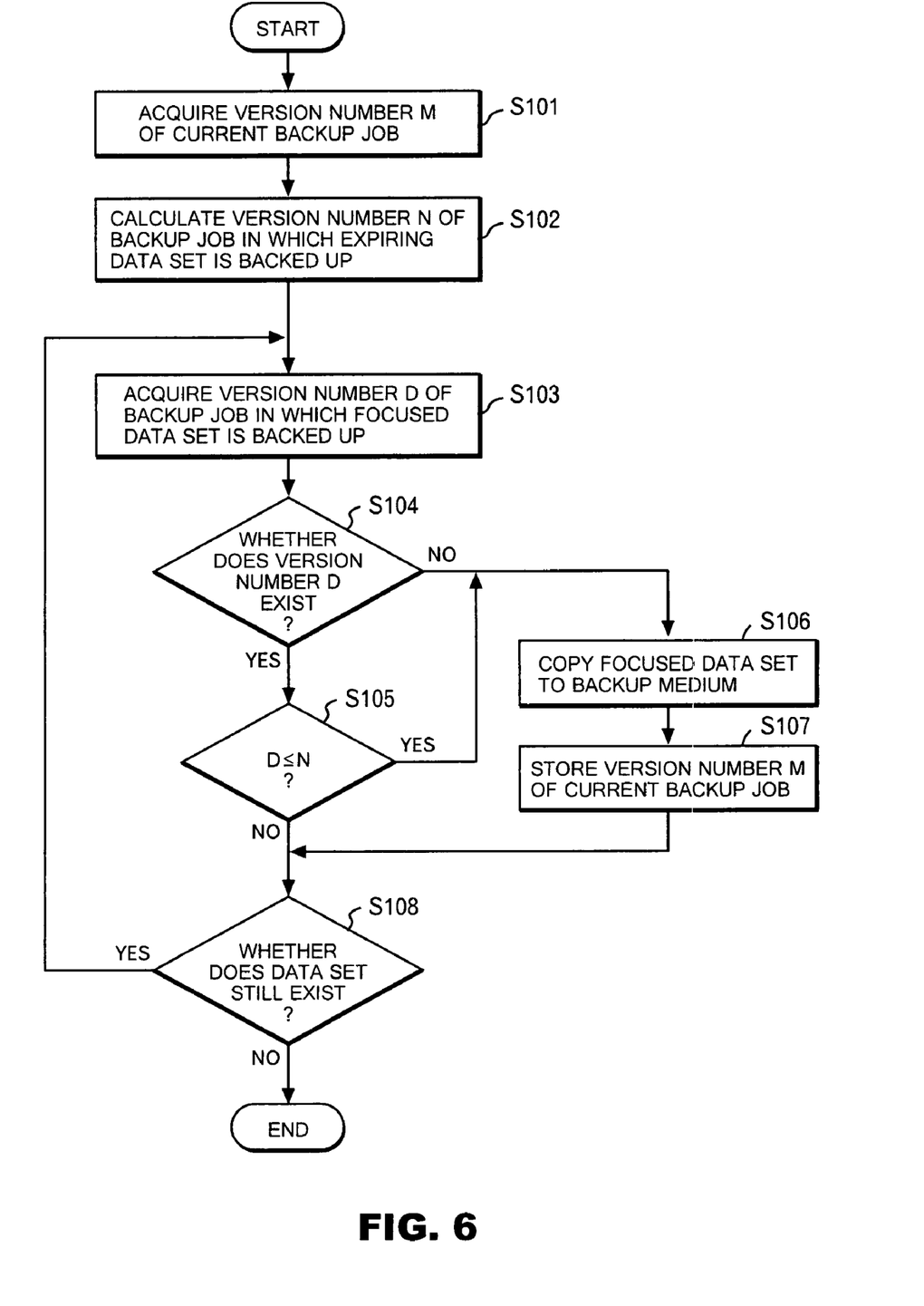
FIG. 6 is a flowchart of a method for determining which dataset should be backed up, in accordance with a first embodiment of the present invention.

FIG. 6 is a flowchart of a method for determining which dataset should be backed up, in accordance with a first embodiment of the present invention. After a backup run has been started, acquisition section 17 acquires a version number M (step S101). A version number is a value that increases by one on every execution of a backup run. It is preferable that the version number be able to provide a range of values that would not run out during a period of use of the system. For this purpose, preferably, the version number can be set at an initial value (for example, zero) when the system is built, and that a sufficiently large integer value can be set as the maximum value. The version number of the backup run is stored in a predetermined storage region when the last backup run has been completed, and the value obtained by adding one to the version number stored in the storage region is used as the version number for the current backup run.

In addition, acquisition section 17 acquires an expiration period E for backed-up data, and calculates a version number N of a backup run in which data expiring upon execution of the current backup run has been backed up (step S102). The expiration period E is a value that is set by means of an instruction from a user, as a part of configuration information, when the system is configured. Moreover, the data backed up in the backup run of the version number N expires on execution of the current backup run (version number M), which is the $E^{th}$ backup run after the backup run of the version number N. For this reason, the version number N can be found by calculating an equation: N=M−E.

Since determination section 18 uses the above-mentioned information for determining whether or not to back up each data set, the above-mentioned information is transmitted to determination section 18. Subsequently, a determination process is performed to determine whether or not to back up each dataset. Then, if it is determined to back up a dataset, a copy process is performed, and the dataset is copied to backup medium 15.

Specifically, acquisition section 17 acquires, from information storage section 16, a version number D of a backup run in which the last backup of a focused dataset has been executed (step S103). The version number D is included in the management information on the focused data set. Then, acquisition section 17 also transmits such information to determination section 18.

In response, determination section 18 determines whether or not the version number D has been acquired in step S103 (step S104). If the dataset has never been backed up, the version number D does not exist. Moreover, as will be described later, the version number is erased for a dataset that has been updated since the last backup run. Accordingly, in step S104, determination section 18 determines whether or not the focused dataset corresponds to any of the above cases.

If the version number D cannot be acquired, the dataset corresponds to any of the cases where the dataset has never been backed up, and where the dataset has been updated since the last backup run, as described above. For this reason, the dataset should be backed up. Thus, the focused dataset is read from data storage section 11, and copied to backup medium 15 (step S106). Specifically, first access section 13 reads the focused dataset from data storage section 11, and transfers the read-out dataset to second access section 14. Then, second access section 14 writes the dataset to backup medium 15. At this time, update section 19 overwrites the version number stored correspondingly to the focused dataset, with the version number M of the current backup run, in the management information stored in information storage section 16 (step S107).

Otherwise, if the version number D can be acquired, a determination is made whether or not the version number D is equal to or smaller then the version number N (step S105). If the version number D is equal to or smaller than the version number N, the data obtained by the last backup has already become so old that the data should be backed up again. Accordingly, the focused dataset is read from data storage section 11, and copied to backup medium 15 (step S106). Specifically, first access section 13 reads the focused dataset from data storage section 11, and transfers the read-out dataset to second access section 14. Then, second access section 14 writes the dataset to backup medium 15. At this time, update section 19 overwrites the version number stored correspondingly to the focused dataset, with the version number M of the current backup run, in the management information stored in information storage section 16 (step S107).

However, if the version number D is larger than the version number N, a backup of the dataset is not executed. Then, regardless of the determination result regarding the necessity of a backup, a determination is made whether or not the next dataset exists (step S108). If the next dataset exists, the process goes back to step S103. If not, the process is terminated.

Figure 7:
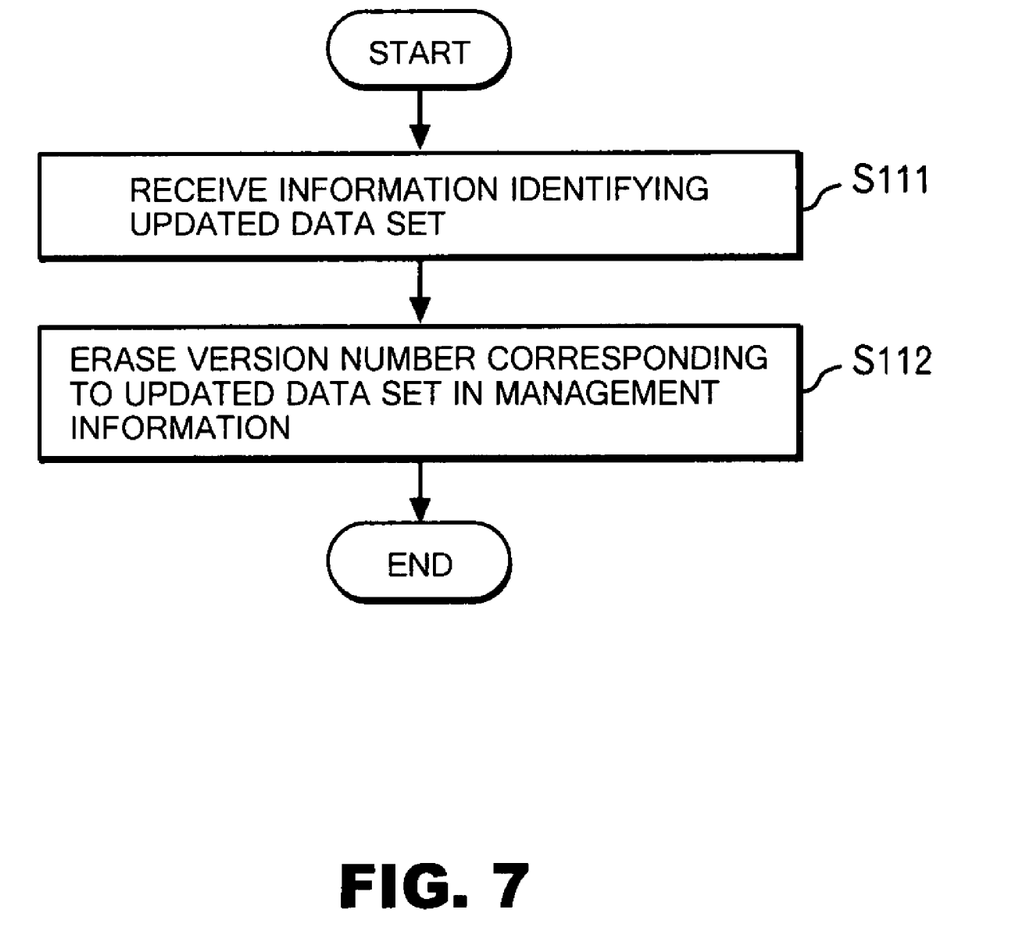
FIG. 7 is a flowchart of a method for reflecting an update of a dataset in the management information, in accordance with a first embodiment of the present invention.

FIG. 7 is a flowchart showing an operation for reflecting an update of a dataset in the management information, in accordance with a first embodiment of the present invention. This operation starts once first access section 13 has updated a certain dataset stored in data storage section 11 in response to an instruction from AP 12. First, update section 19 receives information specifying the updated dataset from first access section 13 (step S111). Then, update section 19 erases the version number stored correspondingly to the concerned dataset in the management information stored in information storage section 16 (step S112).

Figure 8:
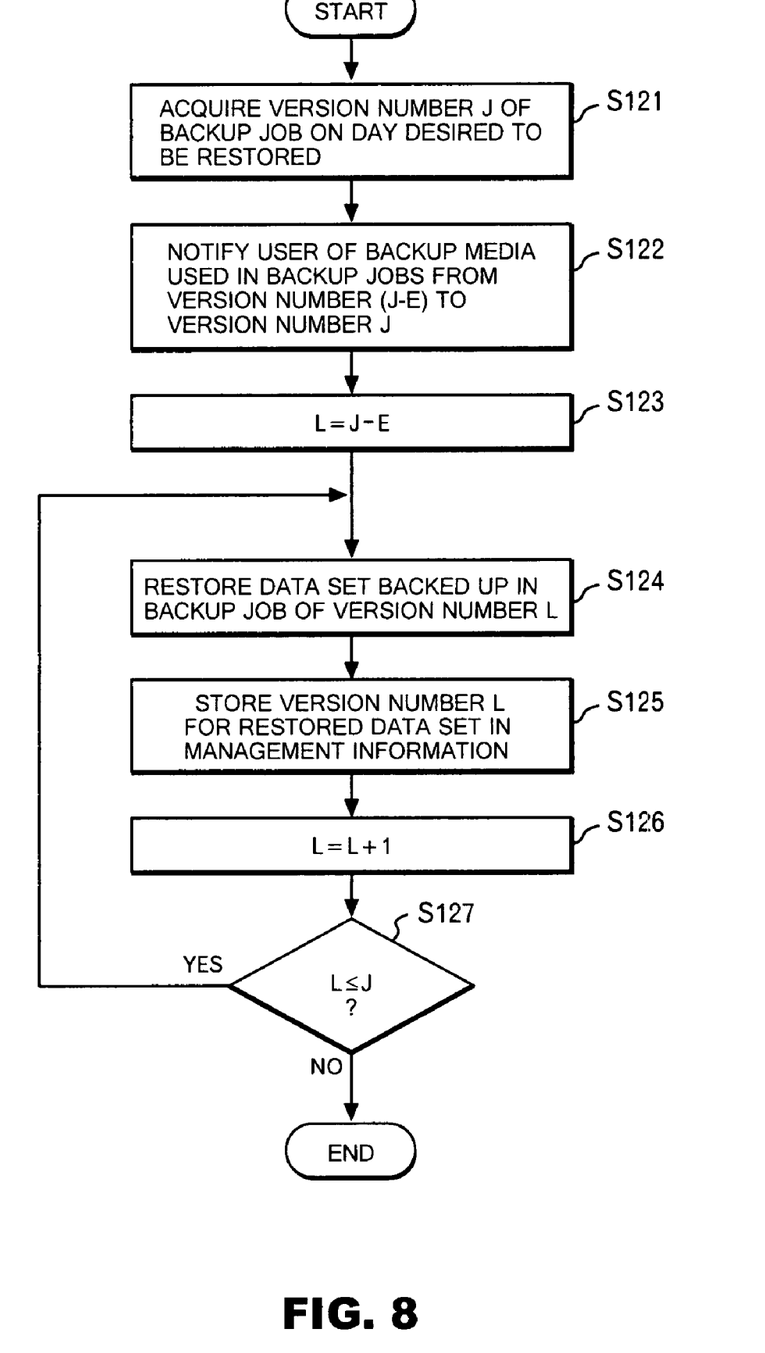
FIG. 8 is a flowchart of a method for restoring a dataset, in accordance with a first embodiment of the present invention.

FIG. 8 is a flowchart showing an operation for restoring a dataset, in accordance with a first embodiment of the present invention. Initially, acquisition section 17 acquires the version number J of a backup run corresponding to a day whose data state is desired to be restored (step S121). For example, the latest version number is taken out from the above-described storage region that stores the version numbers, and the taken-out version number can be used as the version number J. Then, acquisition section 17 acquires the expiration period E for backed-up data, and finds a version number (J−E) by subtracting the expiration period E from the version number J. Then, the user is notified that backup media 15 used in the backup runs from the version number (J−E) to the version number J are made ready for the restoration (step S122).

Afterwards, as an initial value, the version number (J-E) is set in an index L that counts the version numbers of backup media 15 (step S123). Then, a process for restoring data is performed by using each of backup media 15. Specifically, second access section 14 restores the data by using a dataset that has been backed up in the backup run of the version number L (step S124). To be more precise, second access section 14 reads the dataset from backup media 15 corresponding to the index L, and transfers the read-out dataset to first access section 13. Then, first access section 13 writes the dataset to data storage section 11. Update section 19 stores the version number L, as the version number of the restored dataset, in the management information stored in information storage section 16 (step S125).

Subsequently, one is added to the version number L (step S126), and then a determination is made whether or not the resultant version number L is equal to or smaller than the version number J (step S127). If the version number L is equal to or smaller than the version number J, the process goes back to step S124. In contrast, if the version number L is larger than the version number J, the process is terminated. In this way, the operation in the first embodiment of the present invention is terminated.

With the present embodiment, the determination regarding whether the expiration period has passed since the execution of the last backup is based on the number of backup run executions, and the version number is used for determining the number of backup run executions. It is possible, however, to use any kind of information other than the version number as long as the information makes each backup run identified. Instead of using the number of backup run executions, the determination regarding whether the expiration period has passed may be based simply on information on dates.

In addition, the present embodiment adopts a way that, when a dataset is updated, the version number which corresponds to the dataset, and which is stored information storage section 16, is erased. However, the way mentioned above is not necessarily the only way that can be adopted. Specifically, in another possible way, the version number may be changed to a usually-impossible version number, for the purpose of indicating an update of the dataset. Note that, since the update section 19 changes the version number stored in the information storage section 16 at this time, update section 19 can be regarded as a "change section" during the changing function.

Furthermore, the present embodiment employs the following steps for determination. First, the version number D of the backup job in which the last backup has been executed is compared with the value N obtained by subtracting the expiration period E from the version number M of the current backup job. Then, if the value D is equal to or smaller than the value N, it is determined to execute a backup. This manner for determination, however, is just an example, and any kind of manner for determination can be employed. For example, the expiration period E corresponding to a backed-up dataset is stored, and one is subtracted from this expiration period at every backup run execution. In this manner, when the expiration period becomes zero, it can be determined that the expiration period ends.

As is described above, in the present embodiment, the expiration period is given to a backup data. Then, in every backup job, data that is no longer valid is backed up, as well as data that has been updated. With this configuration, the present embodiment has effects of reducing the time required for each backup and evens out the time for backup between backups while keeping the number of media required for the restoration within a predetermined number.

II. Second Embodiment

Figure 9:
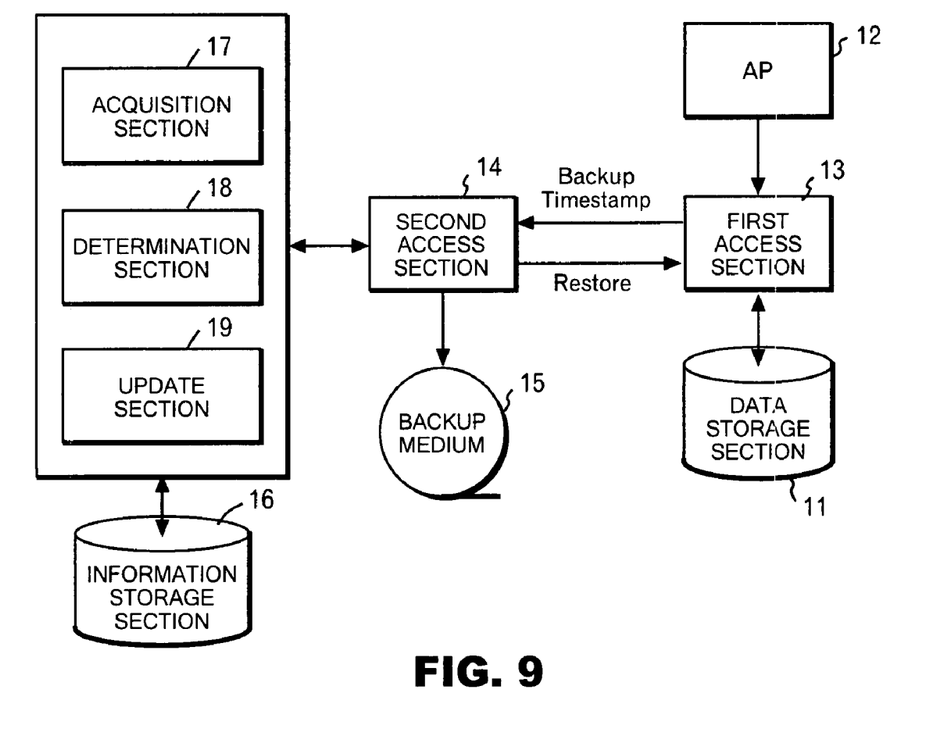
FIG. 9 is a block diagram of a backup system, in accordance with a second embodiment of the present invention.

FIG. 9 is a block diagram of a backup system, in accordance with a second embodiment of the present invention. As shown, a backup system includes data storage section 11, AP 12, first access section 13, second access section 14 and backup medium 15. Since the configuration in FIG. 9 is the same as that described in the configuration in FIG. 4, detail descriptions thereof are omitted here.

In addition to the above configuration, the second embodiment has a function of determining which part of data should actually be backed up among the data stored in data storage section 11. In particular, in the second embodiment, this function is associated with second access section 14. More precisely, this function involves an information storage section 16, an acquisition section 17, a determination section 18 and an update section 19.

Among these sections, information storage section 16, which is formed, for example, of a magnetic disk device, stores management information that is used for determining which part of data should actually be backed up. In addition, acquisition section 17 acquires the management information from information storage section 16, and determination section 18 determines which piece of data should actually be backed up, according to the management information. Moreover, update section 19 updates the management information if needed.

Figure 10:
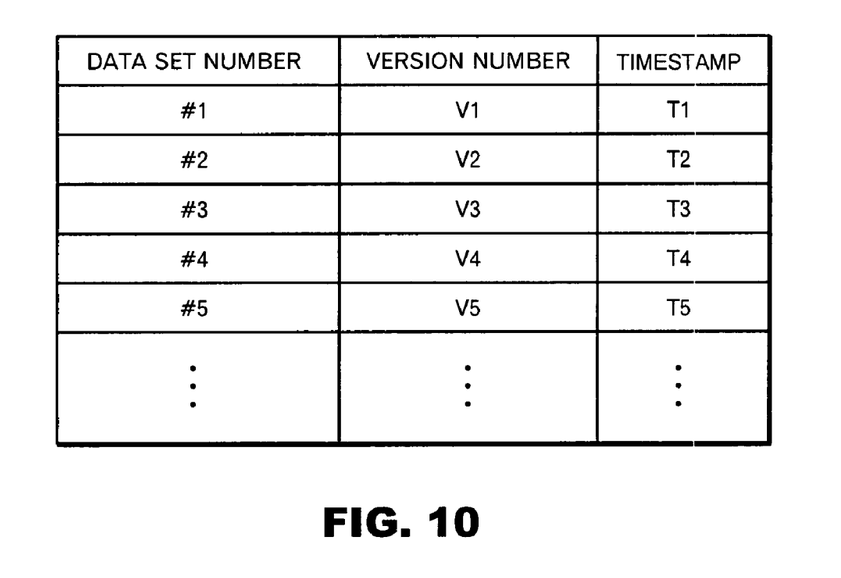
FIG. 10 is a diagram showing an example of management information used in the second embodiment of the present invention.

FIG. 10 shows a part of the management information. The part extracted and shown in FIG. 10 is a part directly related to the second embodiment. In other words, the management information includes metadata of a file system, a block information management table of a magnetic disk device, and the like, and, in each kind of such management information, corresponding relationships are managed as shown in FIG. 10. More specifically, information storage section 16 records the number of each dataset, in the management information. Information storage section 16 also records the number of backup execution indicating the number of backup execution in which the last backup of each dataset is executed (i.e., version number). Information storage section 16 further records a timestamp indicating a date and time of the last backup of each dataset.

The management information may include information such as an expiration period E, which will be descried later, and the version number of the last backup run. Descriptions will be given below of an operation in the system of the second embodiment. Also in the second embodiment, a backup run is executed once a day, as is the case with the example shown in FIG. 3. In other words, the expiration period is equivalent to the number of backup run executions until backed-up data becomes invalid.

Figure 11:
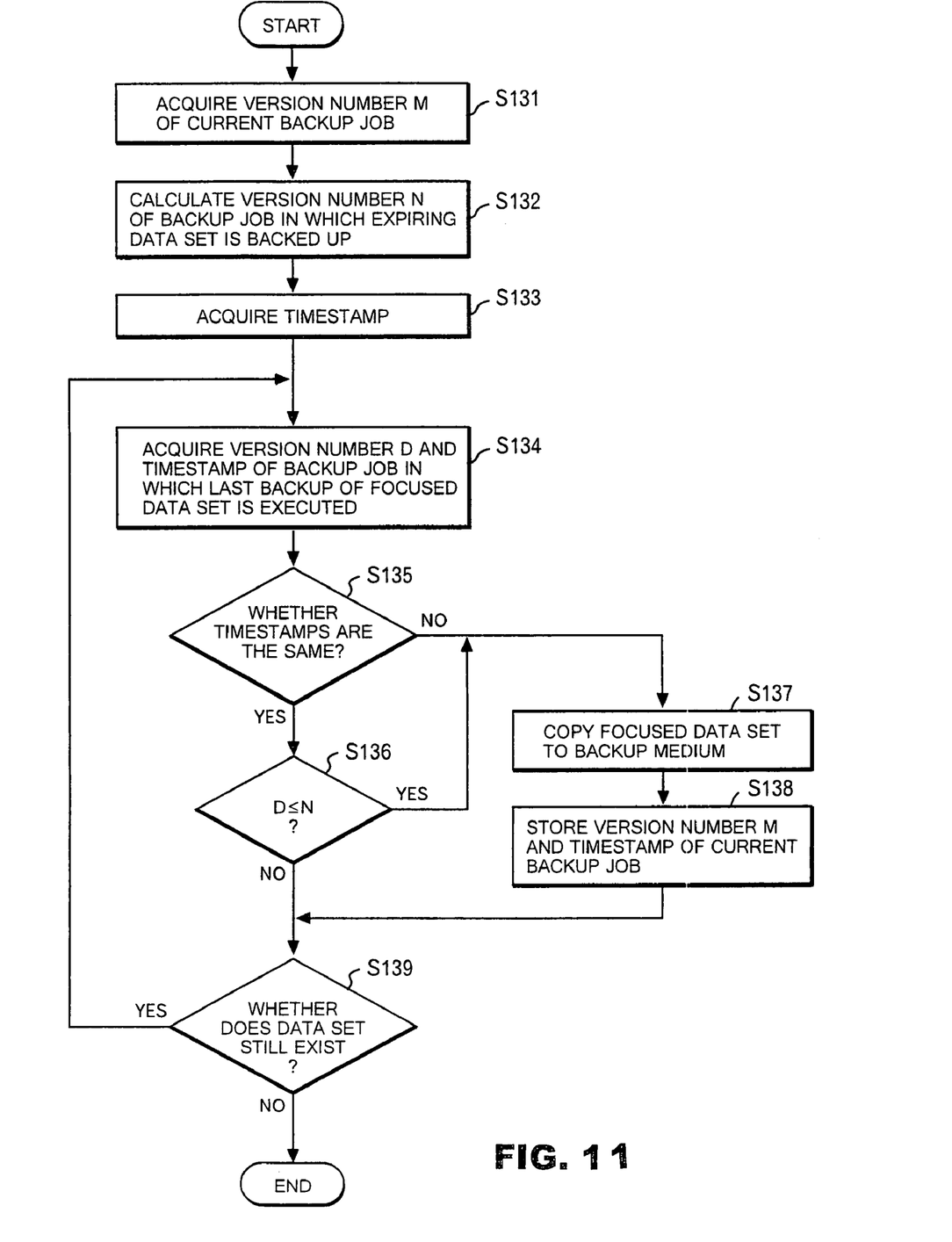
FIG. 11 is a flowchart of a method for determining which data set should be backed up, in accordance with a second embodiment of the present invention.

FIG. 11 is a flowchart of a method for determining which data set should be backed up, in accordance with a second embodiment of the present invention. Once the start of a backup run is instructed, acquisition section 17 acquires a version number M (step S131). In addition, acquisition section 17 acquires the expiration period E for the backed-up data, and calculates a version number N of a backup run in which a piece of data expiring upon execution of the current backup run has been backed up (step S132). The method for obtaining the version number M and the version number N is the same as that in the first embodiment.

Acquisition section 17 acquires a time-stamp indicating a date and time of updating data that needs to be backed up via first access section 13 and second access section 14 (step S133). Since determination section 18 uses this information for determining whether or not to back up each dataset, this information is transmitted to determination section 18. Subsequently, a determination is made whether or not to back up each dataset. If it is determined to back up a dataset, a copy process is performed, and the dataset is copied to backup medium 15.

Specifically, acquisition section 17 acquires the version number D included in the management information on a focused dataset from information storage section 16 (step S134). In a backup run of the version number D, the last backup of the focused dataset has been executed. Acquisition section 17 acquires the timestamp which indicates the date and time of the last backup, and which is included the above-mentioned management information. Then, acquisition section 17 also transmits this information to determination section 18.

By using the above-mentioned information, determination section 18 determines whether or not the timestamp acquired in step S133 is the same timestamp acquired in step S134 (step S135). If the dataset has never been backed up even once, or if the dataset has been updated after the last backup, the timestamp acquired in step S133 shows a later date and time than that acquired in step S134. That is why it is determined, in step S135, whether the two timestamps are the same. When it is determined whether or not dataset has been updated, the determination is based on the timestamp in the second embodiment, unlike in the first embodiment. This is because the configuration in the second embodiment does not allow the update of the dataset, which is executed in data storage section 11 by first access section 13, to be immediately reflected in information storage section 16.

As a result, if the two timestamps for a dataset are not the same, the dataset corresponds to any of the cases where the dataset has never been backed up even once, and where the dataset has been updated after the last backup run, as described above. For this reason, the dataset should actually be backed up at this occasion. Thus, the focused dataset is read from data storage section 11, and copied to backup medium 15 (step S137). Specifically, first access section 13 reads the focused dataset from data storage section 11, and transfers the read-out dataset to second access section 14. Then, second access section 14 writes the dataset to backup medium 15. At this time, update section 19 overwrites the version number and the timestamp, which are stored correspondingly to the focused dataset, respectively with the version number M and the timestamp of the current backup run, in the management information stored in information storage section 16 (step S138).

Otherwise, if these timestamps are the same, another determination is made whether the version number D is equal to or smaller than the version number N (step S136). If the version number D is equal to or smaller than the version number N, the data obtained by the last backup has already become so old that the data should be backed up newly. Accordingly, the focused dataset is read from data storage section 11, and copied to backup medium 15 (step S137). Specifically, first access section 13 reads the focused dataset from data storage section 11, and transfers the read-out dataset to second access section 14. Then, second access section 14 writes the dataset to backup medium 15. At this time, update section 19 overwrites the version number and the timestamp, which are stored correspondingly to the focused dataset, respectively with the version number M and the timestamp of the current backup run, in the management information stored in information storage section 16 (step S138).

Otherwise, if the version number D is larger than the version number N, no backup of the dataset is executed. Then, irrespective of the determination result regarding the necessity of a backup, a determination is made on whether or not the next dataset exists (step S139). If the next dataset exists, the process goes back to step S134. If not, the process is terminated.

Figure 12:
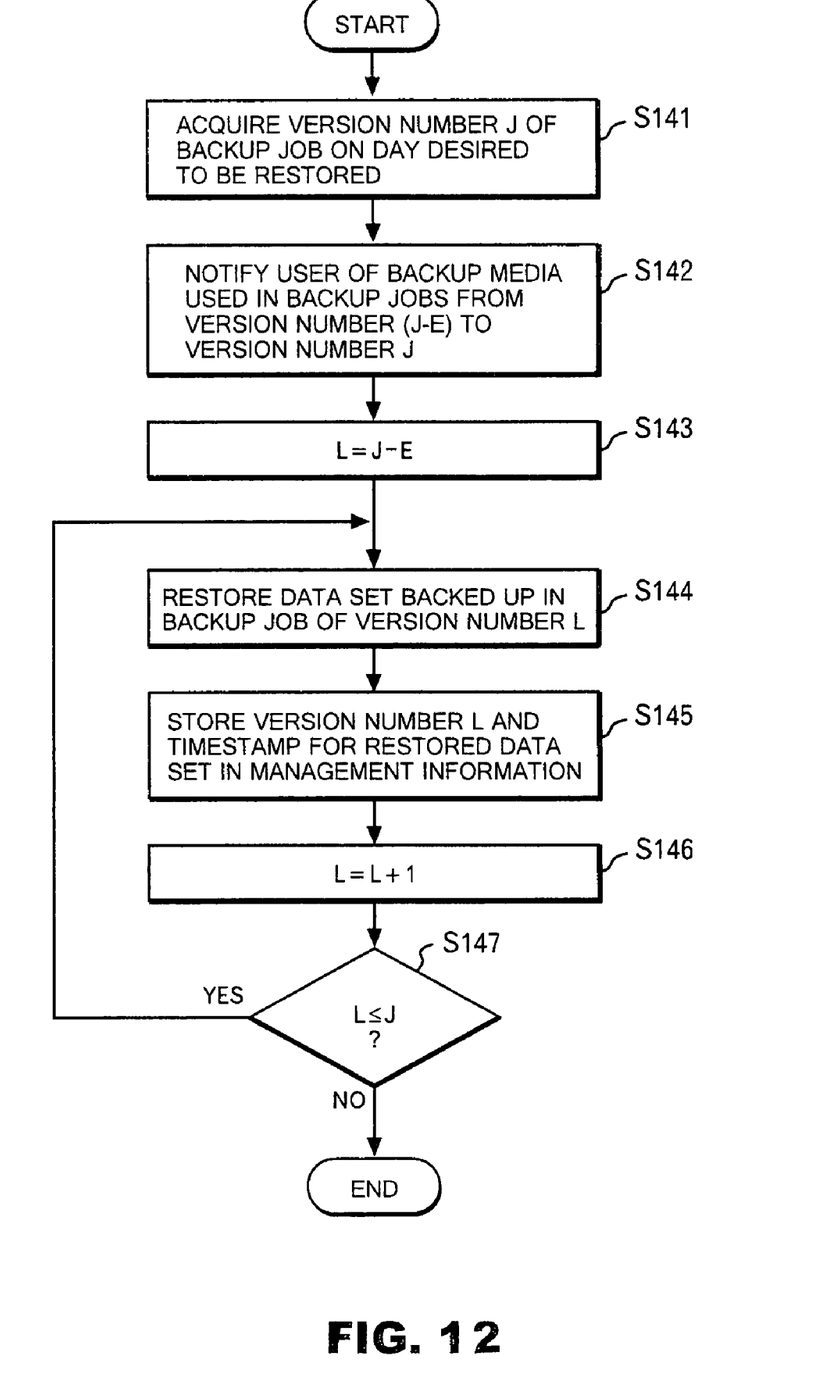
FIG. 12 is a flowchart of a method for restoring a data set, in accordance with a second embodiment of the present invention.

FIG. 12 is a flowchart of a method for restoring a data set, in accordance with a second embodiment of the present invention. First, acquisition section 17 acquires the version number J of a backup job corresponding to a day whose data state is desired to be restored (step S141). Then, the user is notified that backup media 15 used in the backup runs from the version number (J-E) to the version number J are made ready for the restoration (step S142). The method for acquiring the version number J and the version number (J-E) is the same as that in the first embodiment.

Afterwards, as an initial value, the version number (J-E) is set in an index L which counts the version numbers of the backup media 15 (step S143). Then, a process for restoring data is performed by using each of the backup media 15. In other words, second access section 14 restores the data by using a dataset that has been backed up in the backup run of the version number L (step S124). To be more precise, second access section 14 reads the dataset from backup media 15 corresponding to the index L, and transfers the read-out dataset to first access section 13. Then, first access section 13 writes the dataset to data storage section 11.

Moreover, in the management information stored in information storage section 16, update section 19 stores the version number L as a version number of the restored dataset, and stores the restoration date as a timestamp (step S145). Subsequently, one is added to the version number L (step S146), and then it is determined whether or not the resultant version number L is equal to or smaller than the version number J (step S147). If the version number L is equal to or smaller than the version number J, the process goes back to step S144. In contrast, if the version number L is larger than the version number J, the process is terminated. In this way, the operation in the second embodiment of the present invention is terminated.

In the second embodiment, the determination regarding whether the expiration period has passed since the last backup was executed is based on the number of backup run executions, and the determination regarding the number of executions is based on the version number. It is possible, however, to use any kind of information other than the version number as long as the information makes each backup run identified. The determination regarding whether the expiration period has passed may be based simply on information on dates, instead of the number of backup run executions.

Moreover, in the second embodiment, the determination regarding the backing up of a piece of data is performed in the following manner. First, the version number D of the backup run in which the last backup has been executed is compared with the value N obtained by subtracting the expiration period E from the version number M of the current backup run. Then, if the value D is equal to or smaller than the value N, it is determined to execute a backup. This manner for the determination, however, is just an example, and can be replaced with any kind of manner. For example, the expiration period E corresponding to a backed-up dataset is stored, and one is subtracted from this expiration period every time a backup job is executed. In this manner, when the expiration period becomes zero, it can be determined that the backed-up dataset is no longer valid.

In the second embodiment, an expiration period is given to each piece of backup data. Then, in every backup run, the piece of data that is no longer valid is also backed up in addition to the piece of data that has been updated. With this configuration, the second embodiment has effects of reducing the time required for each backup and of evening out the time required between backups, while keeping the number of media required for the restoration within a predetermined number.

The descriptions have been given of the first and second embodiments of the present invention hereinbefore. Then, hereinafter, descriptions will be given of how the execution of a backup run changes a corresponding relationship between each dataset number and the corresponding version number in management information stored in information storage section 16.

FIGS. 13A-13D are diagrams showing the transition in the corresponding relationships between the dataset numbers of the datasets #1 to #12 and the respective version numbers when the datasets are updated as shown in FIG. 1. In FIGS. 13A to 13D, "DS-NO" denotes a dataset number, and "V-NO" denotes a version number. Moreover, an expiration period is set to 7 days.

Figure 13:
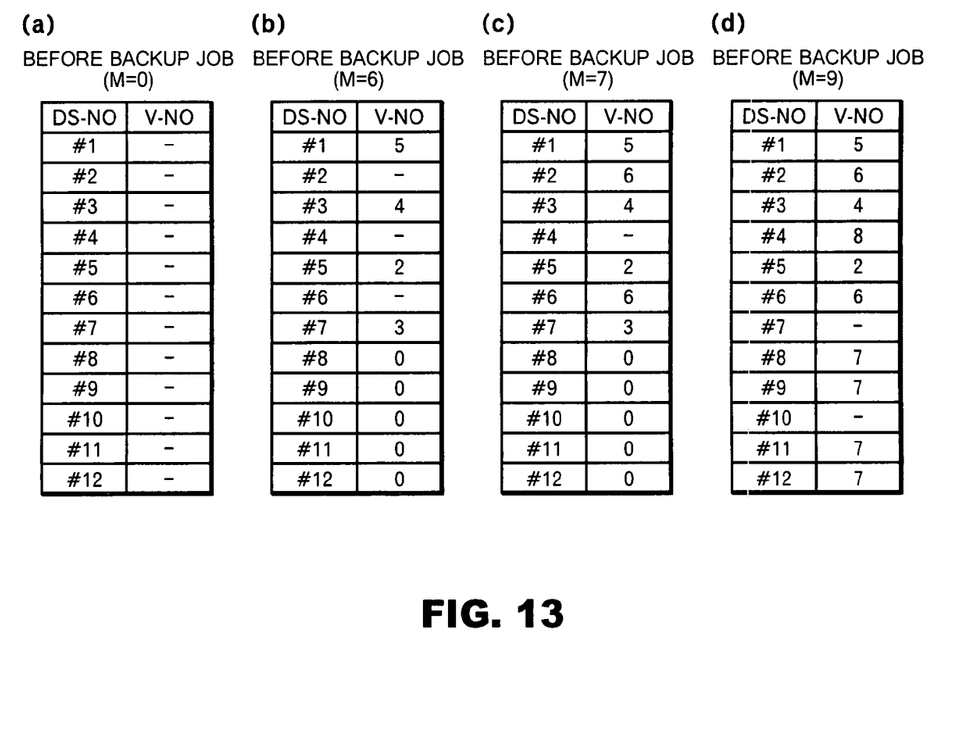
FIG. 13 is a diagram for explaining a transition in the management information.

FIG. 13A shows the corresponding relationships between the dataset numbers and the version numbers before the execution of the backup run on the $0^{th}$ day, that is, in the initial state. As shown in FIG. 13A, none of the datasets has its own version number in the initial state. In this state, since "NO" is determined for all of the datasets in step S104 of FIG. 6, a full backup is executed. Then, in step S107 of FIG. 6, a version number 0 is stored for each of the datasets. Note that, in FIG. 11, an execution of a full backup is determined by comparing timestamps, and then a version number 0 is stored for each of the datasets in step S138 shown in FIG. 11.

FIG. 13B shows the corresponding relationships between the dataset numbers and the version numbers before the execution of the backup job on the $6^{th}$ day. The datasets #1, #3, #5 and #7 are updated in the backup jobs respectively on the $5^{th}$, $4^{th}$, $2^{nd}$ and $3^{rd}$ days, and thus 5, 4, 2 and 3 are stored as the respective version numbers. The datasets #2, #4 and #6 are updated on the $6^{th}$ day, and thus the version numbers are erased.

The datasets #8 to #12 remain the same as those backed up in the backup run on the $0^{th}$ day, and thus the version numbers are still 0.

When the backup run is executed on the $6^{th}$ day in this state, "No" is determined for each of the datasets #2, #4 and #6 in step S104 of FIG. 6. Thus, the backups of these datasets are executed. Then, the version number 6 is stored for each of these datasets. In FIG. 11, the backups of the datasets #2, #4 and #6 are determined by comparing the timestamps, and then the version number 6 is stored for each of these datasets in step S138.

Moreover, "No" is determined for all of the datasets in step S105 of FIG. 6, or in step S136 of FIG. 11. This is because the result of calculation for finding N is −1 (N=M−E=6−7=−1), and thus the version numbers stored for all of the respective datasets are larger than this value, −1.

FIG. 13C shows the corresponding relationships between the dataset numbers and the version numbers before the execution of the backup job on the $7^{th}$ day. The datasets #1, #2 and #3 are backed up in the backup runs on the $5^{th}$, $6^{th}$ and $4^{th}$ days, respectively, and thus 5, 6 and 4 are stored as the respective version numbers. The dataset #4 is updated on the 7th day, and thus the version number is erased. The datasets #5, #6 #7 are backed up in the backup runs on the $2^{nd}$, $6^{th}$ and $3^{rd}$ days, and thus 2, 6 and 3 are stored as the respective version numbers.

The datasets #8 to #12 remain the same as those backed up in the backup job on the 0th day, and thus the version numbers are still 0.

When the backup job is executed on the 7th day in this state, "NO" is determined for the dataset #4 in step S104 of FIG. 6. Thus, the backup of the dataset #4 is executed. Then, in step S107 of FIG. 6, the version number 7 is stored for the dataset #4. Note that, in a case of FIG. 11, it is determined whether or not to back up the dataset #4 by comparing the timestamps, and the version number 7 is stored for the dataset #4 in step S138 of FIG. 11.

Moreover, in step S105 of FIG. 6, or in step S136 of FIG. 11, "YES" is determined for each of the datasets #8 to #12. This is because a result of calculation for finding N is zero (N=M−E=7−7=0), and thus the version number stored for each of the datasets #8 to #12 is equal to or smaller than this value, zero. Accordingly, the datasets #8 to #12 are backed up. Then, in step S107 of FIG. 6, or in step S138 of FIG. 11, the version number 7 is stored for each of these datasets.

Furthermore, the FIG. 13D shows the corresponding relationships between the dataset numbers and the version numbers before the execution of the backup job on the 9th day. The datasets #1, #2, #3, #4, #5 and #6 are backed up in the backup jobs respectively on the 5th, 6th, 4th, 8th, 2nd and 6th days, and thus 5, 6, 4, 8, 2 and 6 are stored as the respective version numbers.

The datasets #7 and #10 are updated on the 9th day, and thus the version numbers are erased. All of the datasets #8, #9, #11 and #12 are backed up in the backup job on the 7th day, and thus 7 is stored as the version number of each of these datasets.

When the backup job is executed on the 9th day in this state, "NO" is determined for the datasets #7 and #10 in step S104 of FIG. 6, and thus these datasets are backed up. Then, in step S107 of FIG. 6, the version number 9 is stored for each of these datasets. Note that, in a case of FIG. 11, it is determined whether or not to back up the datasets #7 and #10 by comparing the timestamps, and then the version number 9 is stored for each of these datasets in step S138 of FIG. 11.

With respect to the dataset #5, "YES" is determined in step S105 of FIG. 6, or in step S136 of FIG. 11. This is because the result of calculation for finding N is 2 (N=M−E=9−7=2), and thus the version number stored for the dataset #5 is smaller than this value, 2. Accordingly, the dataset #5 is backed up. Then, in step S107 of FIG. 6, or in step S138 of FIG. 11, the version number 9 is stored for the dataset #5.

Figure 14:
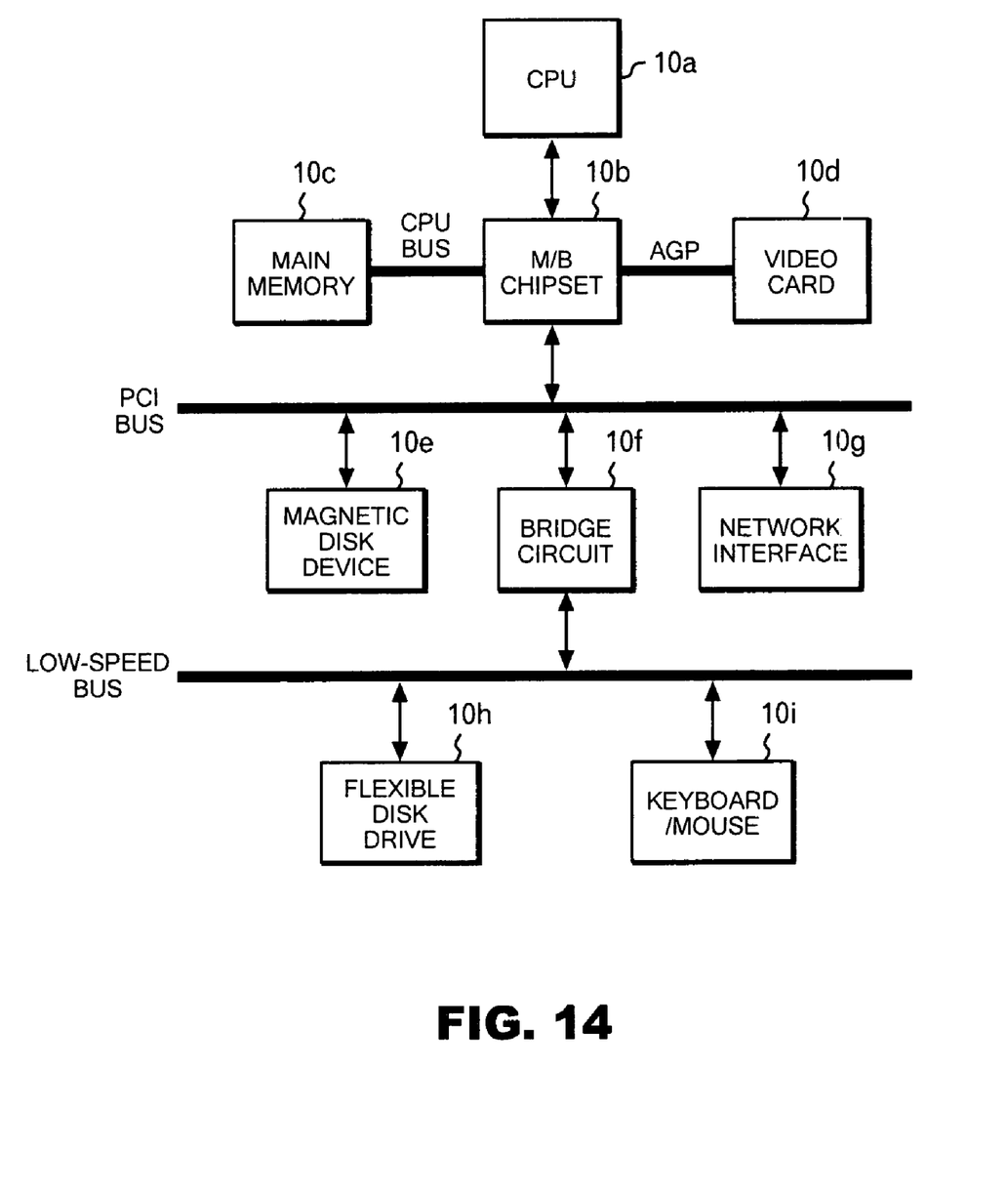
FIG. 14 is a block diagram of a computer.

FIG. 14 is a block diagram of a computer. As shown, a computer includes a central processing unit (CPU) 10a. The computer also includes a main memory 10c connected to CPU 10a via a chipset 10b and a CPU bus, as well as a video card 10d likewise connected to CPU 10a via chipset 10b and an Accelerated Graphics Port (APG). In addition, the computer further includes a magnetic disk device (HDD) 10e and a network interface 10g, both of which are connected to chipset 10b via a Peripheral Component Interconnect (PCI) bus. The computer further includes a flexible disk drive 10h and a keyboard/mouse 10i, all of which are connected to chipset 10b via the PCI bus, a bridge circuit 10f and a low-speed bus.

As has been described, the present invention provides a method and apparatus for performing data backup.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for performing a backup and restore job of an entire or a portion of data, which is a subject for a backup storage of the data, to a storage medium by a computer, comprising steps of:

storing management information having a correspondence relationship between a portion of the data and an identification information of the backup job when the portion of the data has been copied to the medium, by the computer;

acquiring the identification information of the backup job by the computer, including a version number, and storing the version number in a version number storage unit;

identifying a portion of the data, which has not been copied to the media during a predetermined period, based upon the identification information of the backup job;

determining whether to backup the portion of the data to the medium, by the computer;

calculating the version number of a backup job by subtracting a predetermined expiration period from the version number of the current backup job;

backing up the portion of the data by copying the portion of the data to the medium by the computer; and restoring the portion of the data from the medium by the computer by the steps of:

acquiring a latest version number from the version number storage unit;

acquiring the predetermined expiration period for backed-up data;

determining a version number for restoration by subtracting the predetermined expiration period from the latest version number; and reading the portion of the data from the medium by the computer.

2. The method according to claim 1, wherein the identification information contains the version number, which is a number indicating accumulation of a number of executions of the backup jobs, which have already been executed to an entire or a part of the data, by the computer, and in the step of determination, the portion of the data, which has not been copied to the medium during the predetermined period, is identified based upon the predetermined period and the version number of the backup jobs.

3. The method according to claim 1, further comprising the step of determining whether or not a portion of the data has been updated after the previous backup job by the computer and determining if the portion of the data is copied to the medium, wherein in the step of determining whether or not a portion of the data has been updated, even when it is determined that the portion of the data has been updated, the portion of the data is determined to be copied to the medium; and erasing the version number from the version number storage unit, if the portion of the data has been updated, corresponding to the portion of the data that has been updated.

* * * * *